(12) United States Patent
Matsuura (10) Patent No.: US 6,674,624 B2
(45) Date of Patent: Jan. 6, 2004

(54) DIMMER

(75) Inventor: Kimihiro Matsuura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 319 days.

(21) Appl. No.: 09/817,234

(22) Filed: Mar. 27, 2001

(65) Prior Publication Data

US 2001/0041478 A1 Nov. 15, 2001

(30) Foreign Application Priority Data

Mar. 27, 2000 (JP) .................................. P.2000-086554

(51) Int. Cl.[7] .............................. H05F 3/00; G05F 1/00
(52) U.S. Cl. ...................................... 361/115; 315/297
(58) Field of Search .............................. 361/115, 103, 361/106, 112; 323/265, 272, 282; 315/291, 294, 295, 307, 194, 77, 219

(56) References Cited

U.S. PATENT DOCUMENTS

| | | | | |
|---|---|---|---|---|
| 4,904,906 A | * | 2/1990 | Atherton et al. ............. | 315/291 |
| 5,001,398 A | * | 3/1991 | Dunn ........................... | 315/77 |
| 5,268,616 A | * | 12/1993 | Dean et al. .................... | 315/77 |
| 5,339,009 A | * | 8/1994 | Lai .............................. | 315/291 |
| 5,550,440 A | * | 8/1996 | Allison et al. .............. | 315/294 |

* cited by examiner

Primary Examiner—Rajnikant B. Patel
(74) Attorney, Agent, or Firm—Sughrue Mion, PLLC (57) ABSTRACT

A dimmer comprises a PWM circuit for driving through pulse width modulation and a switching device formed on the same chip. The switching device has a driving circuit, an overheat cut-off protecting circuit, a main control FETQA to be a semiconductor switch, a first reference FETQB for generating a reference voltage and a resistor. Furthermore, overcurrent detecting means is implemented by a comparator for detecting a difference between the reference voltage and a drain—source voltage of the main control FETQA and an output thereof cuts off and controls the driving circuit so that the main control FETQA is ON/OFF controlled. The overcurrent detecting means and ON/OFF control means have a soft start function of suppressing a rush current flowing to loads of an illuminating system.

6 Claims, 5 Drawing Sheets

DIMMER

BACKGROUND OF THE INVENTION

1. Technical Field of the Invention

The present invention relates to a dimmer such as a rheostat for carrying out dimming control for a load of an illuminating system through pulse width modulation control (PWM control).

2. Related Art

Figure 5:
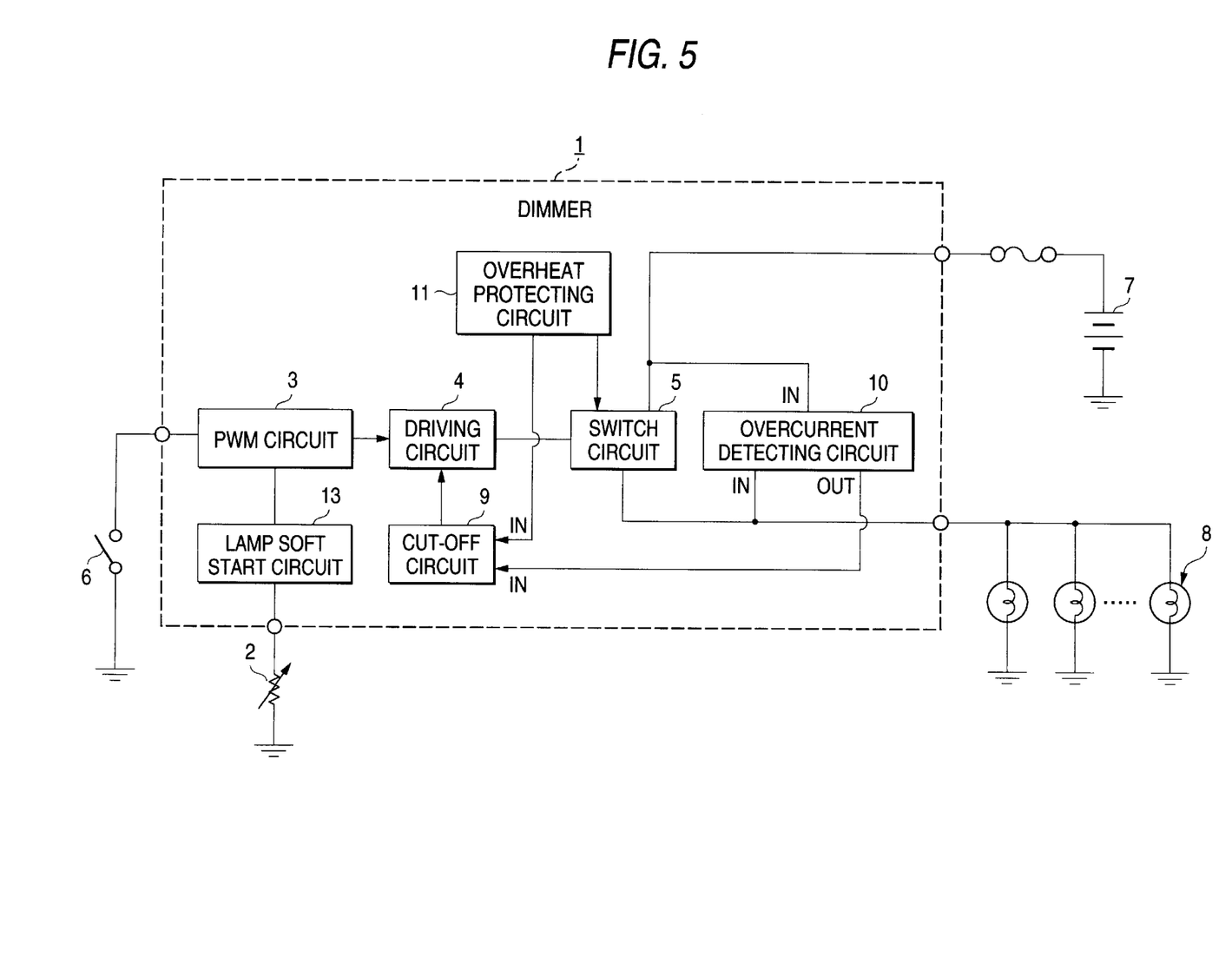
FIG. 5 is a diagram showing a structure according to an example of a related dimmer.

A related dimmer for regulating a quantity of light of a conventional illuminating lamp is shown in FIG. 5, for example. A dimmer 1 shown in FIG. 5 comprises a PWM circuit 3 for outputting a PWM control signal based on pulse width modulation (which will be hereinafter referred to as PWM). An output of the PWM circuit 3 is regulated corresponding to a set value represented by a dimming volume 2. The PWM control signal is generated by the PWM circuit 3 and is sent to a driving circuit 4, and a driving operation of a switch circuit 5 using a semiconductor switch such as a transistor is controlled by the driving circuit 4. The reference numeral 6 denotes an operating switch for bringing the PWM circuit 3 into an operation state. With this structure, a magnitude of a load current supplied from a battery 7 to a load 8 of an illuminating system is changed corresponding to a switching operation of the switch circuit 5 so that a quantity of light emission of the load 8 of the illuminating system can be dimmed and controlled by the PWM.

Moreover, a cut-off circuit 9 is connected to the driving circuit 4 of which operation is controlled in response to the PWM control signal. The operation of the driving circuit 4 can be cut off by the cut-off circuit 9. In addition to a basic circuit portion including the PWM circuit 3, the driving circuit 4, the switch circuit 5 and the cut-off circuit 9, furthermore, an overcurrent detecting circuit 10 is provided to avoid such a situation that an overcurrent generated by an overload or a short-circuit flows to the switch circuit 5 and an overheat protecting circuit 11 is provided to prevent the overheat of the switch circuit 5, thereby controlling an element temperature to have a constant value or less. When an overcurrent flowing to the load 8 and an overheat state of the switch circuit 5 are detected and an output signal of the overcurrent detecting circuit 10 or the overheat protecting circuit 11 is input to the cut-off circuit 9, the operation of the driving circuit 4 is cut off by the cut-off circuit 9.

Moreover, a lamp soft start circuit 13 is provided between the dimming volume 2 and the PWM circuit 3. A set value signal variably regulated by the dimming volume 2 is caused to slowly rise by the lamp soft start circuit 13 and is then input to the PWM circuit 3 so that a rush current can be prevented from flowing into the load 8 when the operating switch 6 is turned ON.

In the related dimmer 1, however, additional circuit portions including the overcurrent detecting circuit 10, the overheat protecting circuit 11 and the lamp soft start circuit 13 are generally provided on the outside of each of basic circuit portions including the PWM circuit 3, the driving circuit 4, the switch circuit 5 and the cut-off circuit 9 in order to maintain versatility. Therefore, there are the following problems.

(1) The number of parts required for constructing the dimmer 1 is increased and a whole outside dimension is increased due to assembly of each circuit portion.

(2) In the existing art, it is substantially impossible to further enhance the detection precision of the overcurrent detecting circuit 10. For this reason, in such a circuit structure that the existent overcurrent detecting circuit 10 is applied to the dimmer 1, an overcurrent often flows to an element of the switch circuit 5 so that a stress of the element is increased. In some cases, therefore, the switch circuit 5 cannot be protected for a desirable constant period.

SUMMARY OF THE INVENTION

In consideration of the circumstances, it is an object of the invention to provide a dimmer having a simple circuit structure, a small size and high reliability.

A dimmer according to the invention comprises:

a semiconductor switch which controls power supply from a power source to a load of an illuminating system;

a driver which outputs a driving control signal to the semiconductor switch;

a reference voltage generator which generates a reference voltage having a voltage characteristic almost equivalent to a voltage characteristic between terminals of the semiconductor switch;

a overcurrent detector which detects an overcurrent of the semiconductor switch based on a difference between the voltage between the terminals of the semiconductor switch and the reference voltage;

a switch controller which controls an ON/OFF state of the driver in response to the overcurrent detected by the overcurrent detector to control the semiconductor switch; and a modulation signal generator which generates a pulse width modulation signal to control the driving control signal, wherein at least the semiconductor switch, the reference voltage generator and the overcurrent detector are formed on a same chip.

Furthermore, it is possible to use the switch controller counts a time required for ON/OFF controlling the semiconductor switch or a number of times of ON/OFF control and supplies a cut-off signal to the driver when a count value exceeds a preset value.

Moreover, it is possible to use the reference voltage generator includes a reference voltage generating circuit having a second semiconductor switch connected in parallel with the semiconductor switch, the second semiconductor switch is connected in series with a resistor provided outside the chip.

As described above, the semiconductor switch, the reference voltage generator and the overcurrent detector are formed on the same chip to constitute the switching device, thereby controlling supply of power to the load of the illuminating system. Consequently, a circuit structure can be simplified and the size of an apparatus can be reduced. In addition, it is possible to implement a dimmer capable of enhancing the precision of overcurrent detection and having a small size and high reliability.

DESCRIPTION OF PREFERRED EMBODIMENT

Embodiments of the invention will be described below with reference to the drawings.

Figure 1:
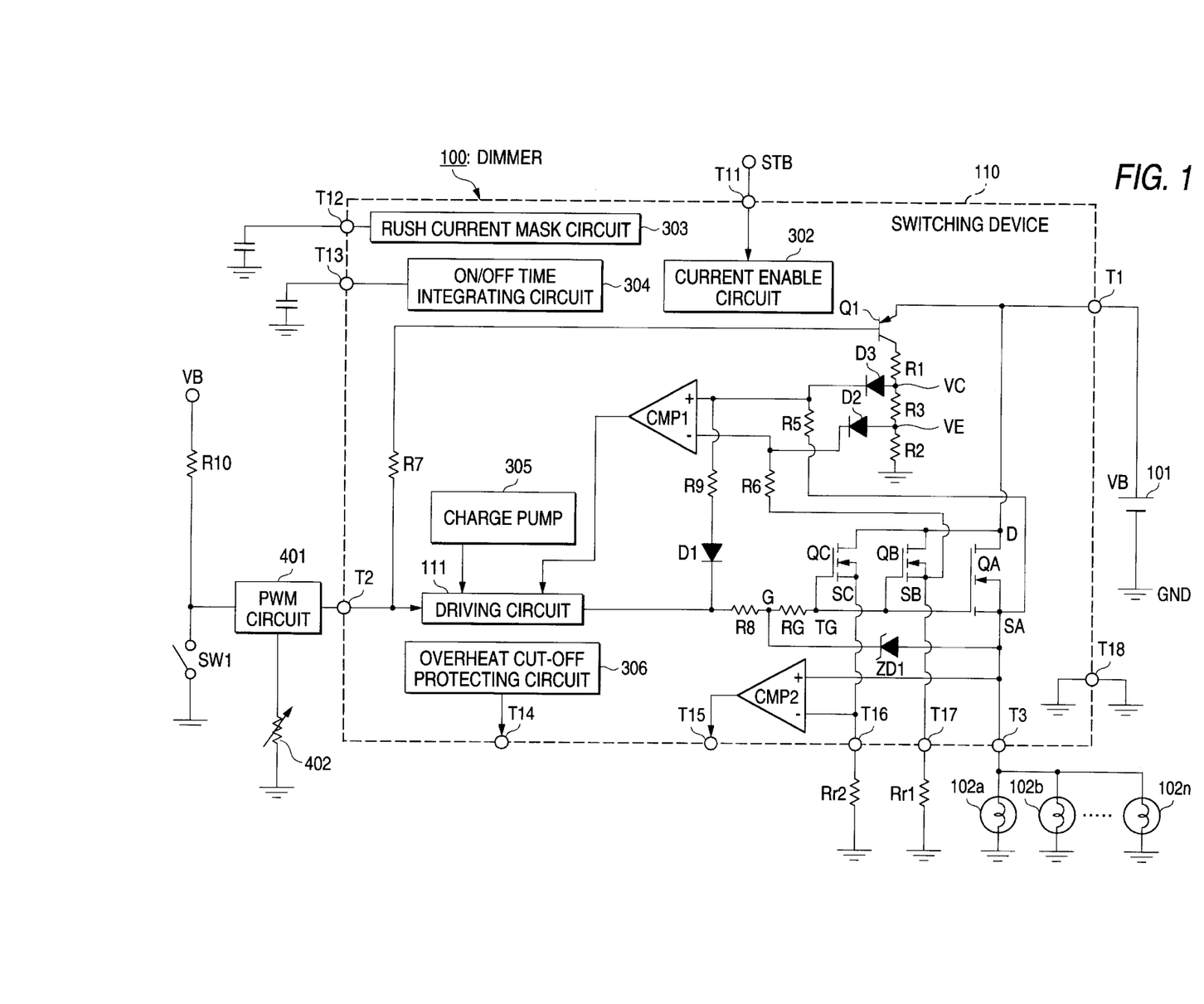
FIG. 1 is a circuit diagram showing a structure of a dimmer according to a first embodiment of the invention.
Figure 2:
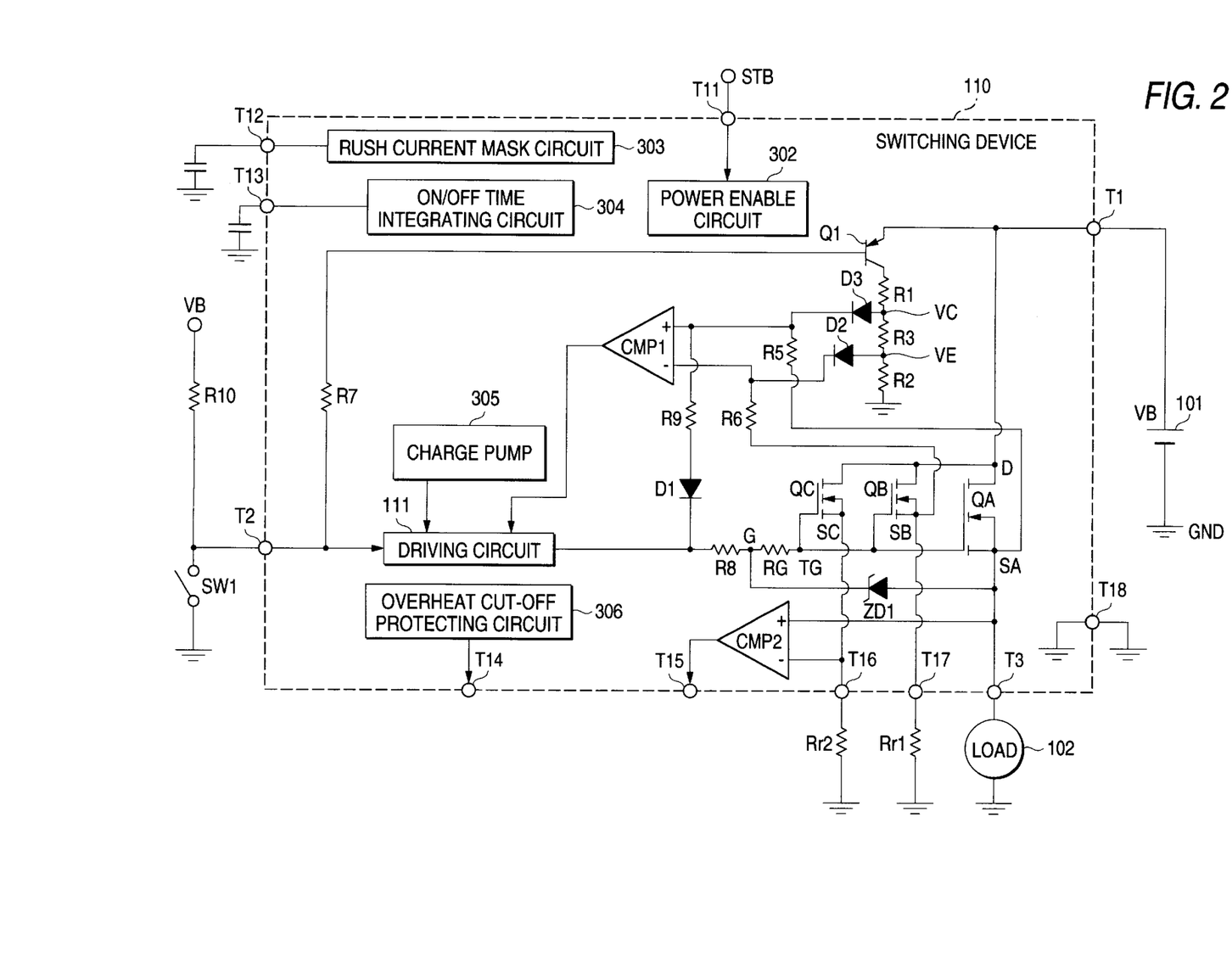
FIG. 2 is a circuit diagram showing a structure of a switching device to be used in the dimmer according to the present embodiment.
Figure 3:
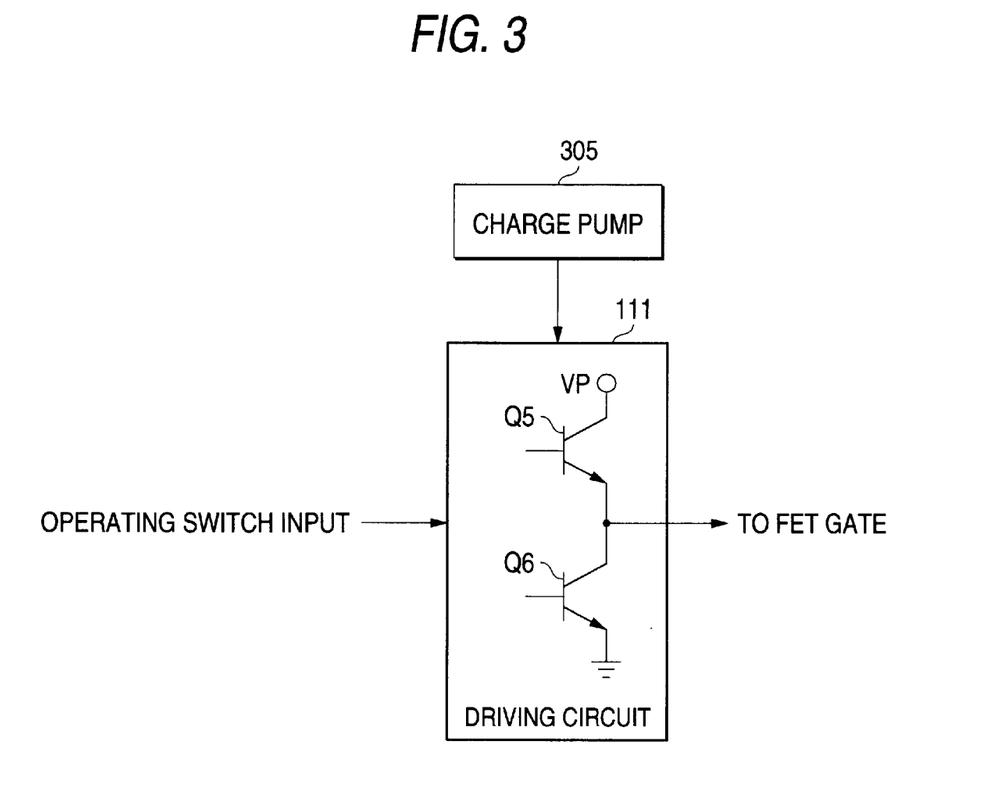
FIG. 3 is a block diagram showing a structure of a driving circuit for driving the switching device.

FIG. 1 is a circuit diagram showing a structure of a dimmer according to a first embodiment of the invention, FIG. 2 is a circuit diagram showing a structure of a switching device to be used in the dimmer according to the present embodiment, and FIG. 3 is a block diagram showing a structure of a driving circuit for driving the switching device.

SWITCHING DEVICE TO BE USED IN THE EMBODIMENTS

Before the detailed description of the embodiments, first of all, a switching device to be used in a dimmer according to the embodiments will be described with reference to FIG. 2.

A switching device 110 show in FIG. 2 is an integrated circuit including a main control FETQA as a semiconductor switch. A drain D—source SA of the main control FETQA is connected in series to a path for supplying, to a load 102, an output voltage VB of a battery 101 provided as a power source. The switching device 110 serves to control power supply through the switching control of the main control FETQA. A integrating driving unit, a protecting unit and a load current detecting unit are formed on the same chip together with the main control FETQA.

More specifically, the switching device 110 comprises a charge pump 305 and a driving circuit 111 which act as the driving unit for the main control FETQA. The driving circuit 111 has a serial connection of a source transistor Q5 having the collector side connected to an output of the charge pump 305 and a sink transistor Q6 having the emitter side connected to a ground potential as shown in FIG. 3, and serves to ON/OFF control the source transistor Q5 and the sink transistor Q6 based on a switching signal generated by the ON/OFF switching of a switch SW1, thereby outputting a signal for controlling the driving operation of the main control FETQA. When an output voltage VB of the battery 101 is 12 V, for example, an output voltage of the charge pump 305 is set to VB+10 V, for example.

Moreover, an overheat cut-off protecting circuit 306 is provided as the protecting unit for the main control FETQA. The overheat cut-off protecting circuit 306 serves to implement an overheat cut-off protecting function which is also added to a general FET having a built-in temperature sensor. If the built-in temperature sensor detects that a temperature of the main control FETQA is raised to a specified temperature or more, detection information is held in a latch circuit. In addition, the main control FETQA is forcibly OFF controlled by turning ON an FET for overheat cut-off connected to a gate TG—source SA of the main control FETQA. The information held in the latch circuit is output through a terminal T14 and can be utilized as diagnosis information. Furthermore, the main control FETQA has each function of an overcurrent detecting unit and an undercurrent detecting unit.

First of all, the overcurrent detecting unit will be described. The overcurrent detecting unit is implemented by a first reference FETQB, resistors R1 to R9 and Rr1, diodes D1 to D3, and a comparator CMP1. More specifically, the first reference FETQB and the resistor Rr1 are unit for generating a first reference voltage in overcurrent detection. That is, the first reference voltage has a voltage characteristic that is almost equivalent to a voltage VDSA between a drain D and source S of the main control FETQA. A threshold of the first reference voltage can be set through the regulation of the resister Rr1. A source (SB) potential of the first reference FETQB is supplied to a "−" input terminal of the comparator CMP1 through the resistor R6. Moreover, a source (SA) potential of the main control FETQA is supplied to a "+" input terminal of the comparator CMP1 through the resistor R5.

Electric potentials of the "+" and "−" input terminals of the comparator CMP1 are clamped on electric potentials VC and VE (strictly, electric potentials obtained by subtracting a forward potential of the diode from the electric potentials VC and VE respectively) through a diode clamp circuit constituted by the resistors R1 to R3 and the diodes D2 and D3, respectively. Moreover, the resistor R9 and the diode D1 which are connected to the "+" input terminal of the comparator CMP1 constitutes a circuit for causing the comparator CMP1 to have a hysteresis.

Therefore, the first reference FETQB provided on the same chip and the resistor Rr1 provided outside the chip generate the first reference voltage, and the comparator CMP1 detects a difference between the first reference voltage and the voltage VDSA of the drain D-source S of the main control FETQA, thereby the overcurrent detecting unit is performed.

Accordingly, when a dead short-circuit is generated on the load 102 side, an output of the comparator CMP1 becomes "effective" ("H" level) so that the driving circuit 111 controls the main control FETQA in OFF state. Moreover, in the case in which the main control FETQA is changed from an OFF state into an ON state when the dead short-circuit is generated or the case in which a layer short-circuit having some short-circuit resistance is generated, the ON/OFF control of the main control FETQA is repeated to overheat the main control FETQA by a periodic heating function and to quicken the overheat cut-off of the main control FETQA by the overheat cut-off protecting function.

By regulating the resistor Rr1, it is possible to set the threshold of the first reference voltage suitable for smoothly executing power supply control for the load 102. The resistor Rr1 is regulated in the following manner.

More specifically, the main control FETQA is usually constituted by a parallel connection of n FETs (having a characteristic equivalent to that of the first reference FETQB). Therefore, it is sufficient that the resistor Rr1 is set to a resistance value of the load 102×n. However, it is desirable that the resistor Rr1 is set to almost equal to a short-circuit resistance as the layer short-circuit is occurred at the load 102. In FIG. 2, while the output of the comparator CMP1 is supplied to only the driving circuit 111, it may be output to the outside through a terminal and may be thus utilized for other control operations.

Next, the undercurrent detecting unit will be described. The undercurrent detecting unit is constituted by a second reference FETQC, the resistor Rr2 and a comparator CMP2. More specifically, the second reference FETQC and the resistor Rr2 are an unit for generating a second reference voltage in undercurrent detection. A source (SC) potential of the second reference FETQC is supplied to a "−" input terminal of the comparator CMP2, and a source (SA) potential of the main control FETQA is supplied to a "+" input terminal of the comparator CMP2.

The second reference FETQC provided on the same chip and the resistor Rr2 provided outside the chip generate the second reference voltage having a voltage characteristic almost equivalent to that of the voltage VDSA between the drain D and the source SA of the main control FETQA, and the comparator CMP2 detects a difference between the second reference voltage and the voltage VDSA of the drain D—source S of the main control FETQA, thereby the undercurrent detecting unit is performed.

Accordingly, when a disconnection failure etc. is caused on the load 102 side, an output of the comparator CMP2 becomes effective ("L" level) and is then sent to the outside of the chip through a terminal T15.

Setting of the second reference voltage, that is, setting of the resistance Rr2 is performed in the following manner. In the same manner as the first reference voltage (resistance Rr1), it is preferable that the resistance Rr2 should be set to (a resistance value of the load 102×n) and it is desirable that the resistance Rr2 is set almost equal to the load resistance as the disconnecting failure is occurred at the load 102.

While the switching device 110 is also provided with a power enable circuit 302, a rush current mask circuit 303 for avoiding an overcurrent decision through a rush current, and an ON/OFF time integrating circuit 304 for carrying out cut-off control through the integration of the number of times of ON/OFF control in addition to the driving unit, the protecting unit, the overcurrent detecting unit and the undercurrent detecting unit, they are not directly related to the invention and specific description will be therefore omitted.

Finally, the features of the switching device 110 will be summarized. First of all, since the switching device 110 does not require a shunt resistor for current detection and can suppress power consumption in a power supply path, it is advantageous to a great current circuit. Secondly, a current sensitivity is high and current detection precision is high. Thirdly, the main control FETQA can be ON/OFF controlled through simple driving control and an overheat cut-off function can be obtained and a processing can be carried out at a higher speed than a program processing of a microcomputer through the ON/OFF time integrating circuit 304. Fourthly, one chip can reduce the size of a circuit structure, can decrease a mounting space and can reduce the cost of an apparatus. Fifthly, current detection is carried out through the detection of a difference between the voltage VDSA of the drain-source of the main control FETQA and the first and second reference voltages. Therefore, the first reference FETQB, the second reference FETQC and the main control FETQA are formed on the same chip. Consequently, it is possible to eliminate in-phase error factors in the current detection, that is, the influence of a power voltage, a temperature drift and a variation between lots.

First Embodiment

A dimmer according to a first embodiment of the invention will be described below with reference to FIG. 1.

A dimmer 100 according to the first embodiment shown in FIG. 1 is constituted by using a switching device 110 described with reference to FIG. 2. More specifically, the dimmer 100 comprises a dimming volume 402 for carrying out dimming setting, a PWM circuit 401 acting as a modulation signal generating unit for generating a pulse width modulation signal (hereinafter referred to as a PWM control signal) corresponding to variable regulation of the dimming volume 402, and the switching device 110.

The switching device 110 has the charge pump 305 and a driving circuit 111 which act as the driving unit for outputting a driving control signal under the control of an operation through pulse width modulation, the overheat cut-off protecting circuit 306 acting as the protecting unit for cutting off the output operation of the driving unit, a main control FETQA acting as a semiconductor switch for controlling power supply from a battery 101 to loads 102a to 102n of an illuminating system in response to a driving control signal sent from the driving unit to a control signal input terminal (that is, a gate), and a first reference FETQB and a resistor Rr1 which act as the reference voltage generating unit for generating a reference voltage having a voltage characteristic almost equivalent to a voltage characteristic between terminals of the semiconductor switch.

Furthermore, there is provided an overcurrent detecting unit for detecting an overcurrent of the main control FETQA. The first reference FETQB provided on the same chip and the resistor Rr1 provided outside the chip generate a first reference voltage, and a comparator CMP 1 detects a difference between the first reference voltage and a voltage VDSA of a drain D—source S of the main control FETQA, thereby the overcurrent detecting unit is performed. Moreover, there is provided ON/OFF control unit (switch control unit) for ON/OFF controlling the semiconductor switch corresponding to the presence of an overcurrent detected by the overcurrent detecting unit.

As described with reference to FIG. 2, the switch device 110 shown in FIG. 1 is an integrated circuit including the main control FETQA as a semiconductor switch. The drain D—source SA of the main control FETQA is connected in series to a path for supplying an output voltage VB of the battery 101 to the loads 102a to 102n of the illuminating system. The switching device 110 serves to control power supply through the switching control of the main control FETQA. The driving unit, protecting unit, the overcurrent detecting unit and the undercurrent detecting unit are integrally formed on the same chip together with the main control FETQA.

The charge pump 305 for obtaining a higher voltage than the output voltage VB of the battery 102 to drive the main control FETQA is connected to the driving circuit 111 for driving the main control FETQA. The driving circuit 111 serves to supply a driving control signal to the main control FETQA and to cut-off thereof in response to output signals sent from the PWM circuit 401 and the overheat cut-off protecting circuit 306 to be the protecting unit for the main control FETQA.

The main control FETQA has each function of the overcurrent detecting unit and the undercurrent detecting unit and utilizes only the overcurrent detecting unit in the present embodiment. The overcurrent detecting unit is implemented by the first reference FETQB, the resistors R1 to R9 and Rr1, diodes D1 to D3 and the comparator CMP1. The overcurrent detecting unit has the function of turning ON/OFF the loads 102a to 102n of the illuminating system when a load current flowing in the main control FETQA exceeds a threshold set by the first reference FETQB and of completely turning OFF the loads 102a to 102n of the illuminating system if the control is continuously carried out for a predetermined time.

For example, by setting a threshold of a reference voltage of the main control FETQA for controlling the power supply from the battery 101 to the loads 102a to 102n of the illuminating system to be smaller than a value of a rush current of each of the loads 102a to 102n through the regulation of the resistor Rr, the main control FETQA is ON/OFF controlled such that a great rush current exceeding the threshold does not flow when the loads 102a to 102n start to be driven. When the loads 102a to 102n of the illuminating system are heated and are brought into a stationary state, a current flowing to the loads is reduced to be equal to or smaller than the threshold. Therefore, the main control FETQA is brought into a normal ON state.

By such a function, it is possible to implement the function or carrying out soft start such that a rush current does not flow to the loads 102a to 102n of the illuminating system when starting the driving operation. Therefore, it is not necessary to use an externally provided lamp soft start circuit which has conventionally been required. In other words, according to the embodiment, the overcurrent detecting unit also serves as soft start unit so that a circuit structure can be simplified.

As described in the column of the switching device to be used in the embodiments, the switching device 110 has features that the formation of the first reference FETQB, a second reference FETQC and the main control FETQA on the same chip can eliminate in-phase error factors in current detection, that is, the influence of a supply voltage, a temperature drift and a variation between lots. Therefore, the precision of overcurrent detection can be enhanced. Moreover, an enhancement in the precision of the overcurrent detecting unit can set the threshold of the reference voltage in the main control FETQA with a small variation more strictly. Therefore, a set central value of the threshold can be reduced. Furthermore, the decision of an overcurrent is quickened and a response speed of the cut-off operation is increased. Consequently, a deviation of a cut-off protection current value for the threshold can be controlled. As a result, a variation in a temperature is reduced during heat generation of the main control FETQA so that the heat generation can be regulated with high precision. Thus, the precision of a protecting function such as overcurrent detection control in the dimmer can be enhanced so that the reliability of the switching device can be improved.

Moreover, the switching device 110 takes charge of the function of each units other than the PWM circuit 401. Therefore, it is possible to provide a dimmer having a simple circuit structure, a small size and high reliability. Furthermore, the threshold of the reference voltage in the main control FETQA can be variably set easily in the first reference FETQB by regulating the resistor Rr provided outside the chip of the switching device 110. Accordingly, it is possible to provide a dimmer which can be handled easily.

Second Embodiment

Figure 4:
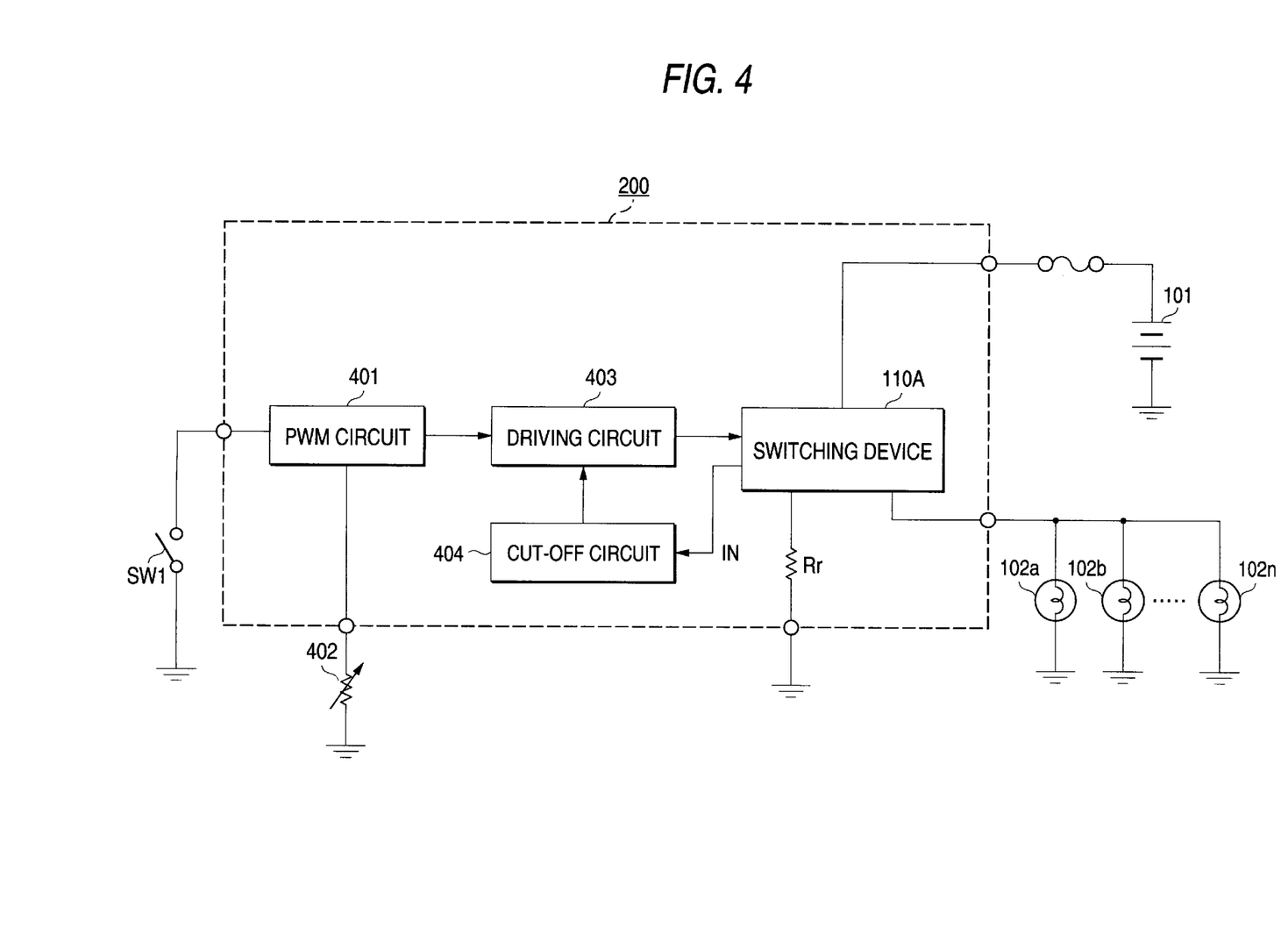
FIG. 4 is a block diagram showing a structure of a dimmer according to a second embodiment of the invention.

Next, a dimmer according to a second embodiment of the invention will be described with reference to FIG. 4. FIG. 4 is a block diagram showing a structure of the dimmer according to the second embodiment of the invention.

A dimmer 100A according to the second embodiment shown in FIG. 4 is a variant of the first embodiment, applies a switching device 110A having a functional structure in which the driving unit and the protecting unit are not provided, and the driving unit and the protecting unit are provided as externally circuits. More specifically, the dimmer 100A comprises a PWM circuit 401 acting as modulation signal generating unit for generating a PWM control signal, an operating switch SW1, a dimming volume 402, a driving circuit 403 as the driving unit, a cut-off circuit 404 as the protecting unit, the switching device 110A and a resistor Rr for generating a reference voltage.

The driving circuit 403 includes a charge pump for obtaining a higher voltage than an output voltage VB of a battery 101 to drive a semiconductor switch (a main control FET) in the switching device 110A, and serves to output a driving control signal based on a PWM control signal sent from the PWM circuit 401 and a cut-off signal sent from the driving circuit 403 and to control the driving operation of the switching device 110A. In this case, the driving control signal serves to supply a driving voltage to a circuit connected to a gate of the semiconductor switch provided in the switching device 110A and to cut off the supply.

The cut-off circuit 404 serves to output a cut-off signal based on an overcurrent detecting signal sent from the switching device 110A, thereby cutting off and controlling the driving circuit 403 when an overcurrent is generated. In this case, a time required for ON/OFF controlling the semiconductor switch through overcurrent control unit in the switching device 110A or the number of times of ON/OFF control is counted and a cut-off signal is sent to the driving circuit 403 when a count value exceeds a preset value. Consequently, when the ON/OFF control of the semiconductor switch is continuously carried out for a predetermined time or at a predetermined number of times, the driving unit can be brought into an output stop state. Thus, the switching device 110A can be reliably turned OFF when the overcurrent is generated.

Also in the dimmer 100A having such a structure, it is possible to obtain the same functions and effects as those in the dimmer according to the first embodiment. More specifically, the dimmer can be reliably protected from the overcurrent or excessive heat generation with high precision. Consequently, it is possible to relieve a stress on the switching device or a load. Thus, the reliability of the apparatus can be enhanced. Moreover, peripheral circuits can be decreased greatly, the structure of the apparatus can be simplified and the size of the apparatus can be reduced.

As described above, according to the invention, the circuit structure can be simplified and the size of the apparatus can be reduced. In addition, it is possible to provide a dimmer capable of enhancing the precision of overcurrent detection and having a small size and high reliability.

What is claimed is:

1. A dimmer comprising:

a semiconductor switch which controls power supply from a power source to a load of an illuminating system;

a driver which outputs a driving control signal to the semiconductor switch;

a reference voltage generator which generates a reference voltage having a voltage characteristic substantially equivalent to a voltage characteristic between terminals of the semiconductor switch;

a overcurrent detector which detects an overcurrent of the semiconductor switch based on a difference between the voltage between the terminals of the semiconductor switch and the reference voltage;

a switch controller which controls an ON/OFF state of the driver in response to the overcurrent detected by the overcurrent detector to control the semiconductor switch; and a modulation signal generator which generates a pulse width modulation signal to control the driving control signal, wherein at least the semiconductor switch, the reference voltage generator and the overcurrent detector are formed on a same chip.

2. The dimmer according to claim 1, wherein the switch controller counts a time required for ON/OFF controlling the semiconductor switch or a number of times of ON/OFF control and supply a cut-off signal to the driver when a count value exceeds a preset value.

3. The dimmer according to claim 1, wherein the reference voltage generator includes a reference voltage generating circuit having a second semiconductor switch connected in parallel with the semiconductor switch, the second semiconductor switch is connected in series with a resistor provided outside the chip.

4. The dimmer according to claim 1, wherein the driver has a driving signal generator which generates the driving control signal in response to the pulse width modulation signal.

5. The dimmer according to claim 1, wherein a threshold of the reference voltage is set through regulation of a resistor.

6. The dimmer according to claim 5, wherein the resistor is set to a resistance value of the load.

* * * * *